Nov. 2, 1965 S. G. HINDIN 3,215,562
FUEL CELL WITH SCREEN ELECTRODES
Filed Dec. 22, 1961 2 Sheets-Sheet 1

INVENTOR.
Saul Gerald Hindin
BY
William Klabunde
ATTORNEY.

United States Patent Office 3,215,562
Patented Nov. 2, 1965

3,215,562
FUEL CELL WITH SCREEN ELECTRODES
Saul Gerald Hindin, Wilmington, Del., assignor, by direct and mesne assignments, of one-half to Air Products and Chemicals, Inc., a corporation of Delaware, and one-half to Northern Natural Gas Company, Omaha, Nebr., a corporation of Delaware
Filed Dec. 22, 1961, Ser. No. 161,464
16 Claims. (Cl. 136—86)

This invention relates to fuel cells for the electrochemical oxidation of fuels to produce electrical energy, and is concerned particularly with improvements in a porous fuel cell electrode and the method of making the same.

In fuel cells of the type wherein the fuel and oxidant materials are supplied continuously at one side of separate porous bodies forming the fuel and oxygen electrodes while a body of liquid electrolyte is maintained in constant contact with the other side of the electrodes, a critical requirement in the electrode bodies is homogeneity of porosity.

Experience has shown that optimum porosity is attained when the pore configuration is such that the pores extend entirely through the porous body to provide a continuous communicating path between the supply of fuel or oxidant materials and the body of liquid electrolyte. Ideally there should be no blocked or dead-end pores.

In the absence of a homogeneous pore structure, or a reasonable approximation thereof, certain major problems arise, principally with respect to electrolyte flooding of some pores, excessive gas blow-through in others, or a static fluid condition at the active areas, possibly involving entrapment of gaseous or liquid reactants or reaction products which normally should be purged from the porous electrode body by the continuous supply of fresh reactants.

Furthermore, it is important to have the pore diameter closely controlled so as to match the surface tension of the electrolyte and of the gaseous material to be diffused through the electrode. Thus, it is possible that different pore sizes may be required for the fuel and oxygen electrodes of a fuel cell. For example, in a gas diffusion electrode, the optimum pore structure for an electrode utilizing hydrogen may be quite different from one utilizing oxygen or air.

A further important consideration is the matter of pore length. For any given pore size, the total internal active surface area available to catalyze the desired electrode reaction is a function of pore length. It has been found, however, that optimum diffusion rates as well as other advantages are attained through porous electrode plates of minimum thickness.

Attempts to achieve any substantial increase in total active surface area by increasing the overall physical dimensions of the thin porous plate or sheet forming the electrode are hindered, if not defeated, by the structural, fabrication, and operational problems involved in the use of large thin sheets.

It is extremely difficult to satisfy all the criteria for a good porous electrode, and previous attempts to do so have not proved commercially practicable, principally because the known electrode preparation procedures are so involved as to make the cost prohibitive.

In accordance with the invention a porous electroconductive electrode of optimum homogeneous pore structure and diffusion characteristics is obtained by a thin screen structure, formed as a woven mesh or as a perforate flat sheet, having multiple openings of specific predetermined size. The size of the openings between the crossed strands of the woven mesh or the size of the perforations in a flat sheet will determine the pore size or diameter, and the thickness of the mesh or of the perforate sheet will determine the pore length. In forming the screen, the strands forming the mesh may be of any desired cross-sectional configuration, as may the openings in the flat perforate sheet.

In its simplest form the electrode is contemplated as suitably comprising a single screen element. Increased active surface area is obtained, however, by forming a composite electrode consisting of multiple screen elements arranged as superimposed or juxtapositioned layers with minimum clearance between the layers.

When the individual screens forming a composite electrode are thin flat perforate sheets, thin spacing means are provided between adjacent sheets so as to prevent any blocking of the pores by reason of surface-to-surface contact and misalignment of the openings. When the screens are of wire mesh, such spacing means are unnecessary because the uneven surface of the mesh prevents any substantial blocking of the pores.

When assembled in a fuel cell, such electrodes may be arranged as a barrier between a body of liquid electrolyte and a manifold chamber receiving a continuous feed of fluid reactants for distribution to the electrode pores, or the electrode may be surrounded by the body of liquid electrolyte and the gaseous reactants may be introduced into the liquid body at a location below or beneath the electrode so that the gaseous material rising within the liquid will have the maximum immediate access to the pores.

With the composite form of electrode arranged as a barrier between reactants and electrolyte and with provision for venting the electrolyte chamber, the pressure of the reactant stream will cause the gaseous material to travel successively through the various screen layers so as to be made available at all the pore sites.

When the composite electrode suspended within or surrounded by the body of liquid electrolyte a slight change in structure may be required in the perforate sheet type of electrode. The spacing means between the perforate sheets should not seal off the peripheral region of the narrow space, since the rising streams of reactant gas should be permitted to enter within and pass upwardly through the narrow space. While spacers may be used with the composite mesh electrode, they are not considered necessary, because the irregularities in the surface of the mesh permit side entry of gaseous reactants into the narrow spaces between the mesh layers. In any case, it is contemplated that electro-conductive communication will be provided between the layers of a composite electrode.

For a fuller understanding of the invention reference may be had to the following description and claims taken in connection with the accompanying drawings forming part of this invention, in which:

Figure 1:
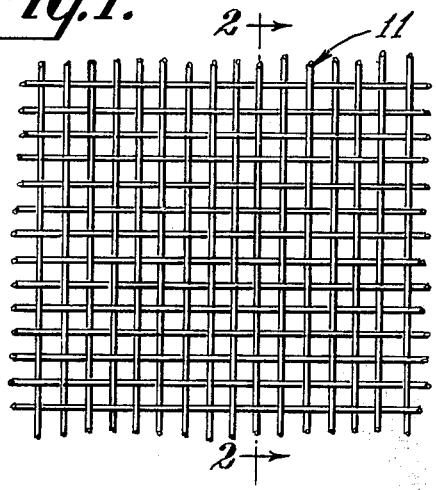
FIGS. 1 and 2 are enlarged fragmentary elevation and end views, respectively, of a composite mesh screen electrode according to the invention.
Figure 2:
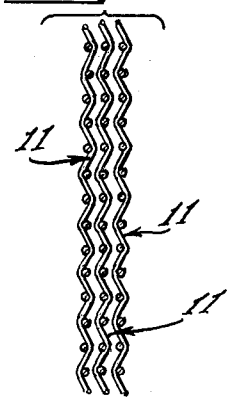

In FIGS. 1 and 2 the composite screen electrode is shown as comprising multiple superimposed layers of mesh 11, three being illustrated in the end view of FIG. 2 merely for convenience. The composite screen electrode may comprise any desired number of individual screens, within practical limits. Preferably, the screens are positioned in face-to-face contact with each other, although in some cases a slight spacing may be more advantageous. In any case, an electro-conductive connection is maintained. For convenience of illustration the screens are shown with their openings in perfect alignment, although such positional relationship is not essential to a proper functioning of the electrode.

Figure 3:
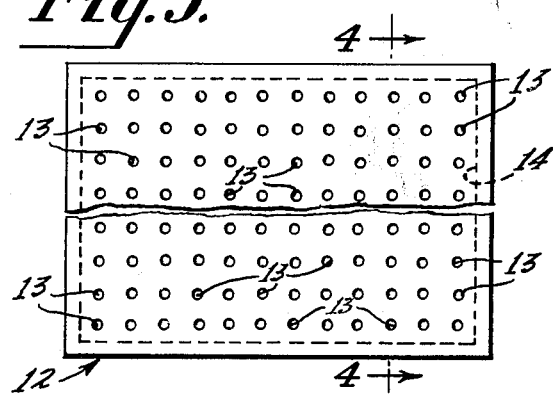
FIGS. 3 and 4 are similar views of an alternative form of composite screen electrode comprising perforate sheets separated by spacers.
Figure 4:
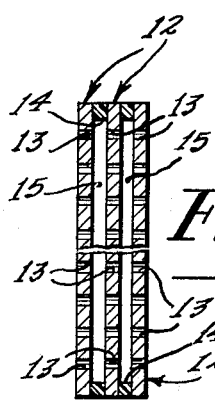

In FIGS. 3 and 4 the composite screen electrode is shown as comprising layers of perforate sheet material 12 having uniformly distributed openings 13 of a size or diameter corresponding to the pore size desired in the finished electrode. The sheets 12 are spaced slightly by spacer elements 14 which serve to keep the flat surfaces of adjacent screens separated. The spacer elements extend about the periphery of the electrode screens 12, but are not necessarily continuous. If needed for additional rigidity spacing means may be provided at other locations inwardly of the peripheral region. It is to be understood that the thickness of both screens and spacers is preferably the minimum consistent with ease of manufacture and sturdiness of construction.

Figure 5:
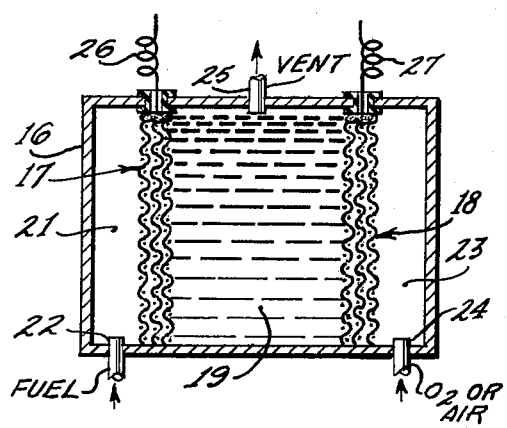
FIG. 5 is a diagrammatic illustration of a fuel cell embodying composite screen electrodes which function also as barriers between a body of liquid electorylte and reactant distributing chambers at opposite sides of the cell for supplying fuel and oxygen or air to the electrodes.

A diagrammatic illustration of a typical cell embodying the present electrode is shown in FIG. 5. It comprises a housing 16 having vertical composite electrodes 17 and 18, representing the anode and cathode, respectively, extending transversely across the housing 16 so as to confine a body of liquid electrolyte 19 in the central region of the housing. The housing and the electrodes are insulated from each other, either by suitable insulating spacers or by reason of the fact that the housing itself is formed from non-conductive material.

The remaining end portions of the housing provide a fuel chamber 21 having a fuel inlet 22, and an oxygen chamber 23 having an oxygen or air inlet 24. The gaseous reactants entering the chambers 21 and 23 pass into the electrodes 17 and 18, respectively, through the pores of the exposed electrode layers. The reactants pass successively through the layers. Any excess reactant gases or gases evolved from the electrode reactions, which normally are purged from the electrodes by succeeding portions of the continuously supplied reactants and pass into the body of liquid electrolyte, are vented from the electrolyte chamber through top vent 25. Since chambers 21 and 23 are pressured slightly, there is a constant serial flow through the layers of the composite screen electrodes. The undulating form of the separate strands forming the individual screens make for an uneven surface, so that a thin but appreciable body or layer of liquid electrolyte may be present between the adjacent screens.

Figure 6:
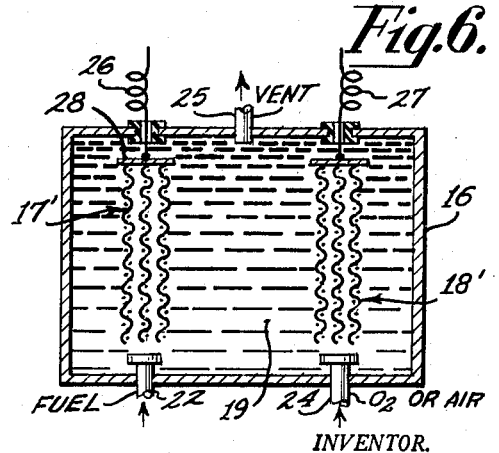
FIG. 6 is a diagrammatic illustration of an alternative cell arrangement in which the composite screen electrodes are suspended wholly within the body of liquid electrolyte and directly above inlet means for distributing gaseous fuel and/or oxygen-containing reactants into the liquid electrolyte adjacently along the bottom edge of the composite electrode.

A diagrammatic illustration of a modified electrode arrangement is shown in FIG. 6. Here the composite electrodes 17' and 18' are merely suspended or otherwise positioned within the body of liquid electrolyte 19 through gas-distributing nozzles 26 and 27, respectively, located below the electrodes. The gaseous materials bubble upwardly through the liquid body around and between the screen layers of the composite electrodes. Since there is no forced flow of the gaseous material through the pores of the screens, easy access of the gas to the internal pores should be provided by a slight spacing of the screen layers. Where spacers are provided between the layers they should be of such form and arrangement as not to interfere with such access of the gaseous material to the spaces between the layers. Thus, while a continuous peripheral spacer would be acceptable where the electrodes are arranged as in FIG. 5, since there is forced serial flow into the screen layers of the composite electrode, an interrupted or discontinuous spacer is required for the modification shown in FIG. 6. The desired effect may be achieved by various means, such as providing a plurality of spacing elements, by forming raised portions on the flat surfaces of the sheet electrodes, or by using a crimped spacer element. The elements designated by the numeral 14 in FIG. 4 may be considered as being in any of the stated possible forms.

In the fabrication of the electrodes, whether they comprise a single screen element or a multiplicity of screen elements arranged in layers, essential requisites are that the electrode have catalytic properties suitable to promote the desired electrode reaction and that it be capable of conducting electric current from the points of generation at the active sites within the electrode body to whatever conductor means is provided to make the current available at the terminals of the cell. The nature of the catalytic material will depend to some extent upon whether acidic or basic electrolyte is to be employed and whether the electrode is to form the anode or the cathode of the fuel cell.

The material forming the individual electrode screens may be intrinsically catalytic, comprising, for example, a thin plate or sheet, or a fabricated mesh, of platinum or other catalytic material suitable for use in an acid electrolyte system with hydrogen or oxygen; or of silver or other catalytic material suitable for use in an alkaline electrolyte with oxygen. Or, the electrode material may be intrinsically non-catalytic or only slightly catalytic, and a coating of catalytic material may be applied in known manner to the screen materials either before or after the screens are formed. For example, the screen may be made of stainless steel, or other material not adversely affected by the electrolyte medium, and platinum, as the selected catalytic material, may be applied to the screen by the reduction of chloroplatinic acid with formic acid. Or, the platinum or other catalytic material may be electro-chemically applied to the screen by electro-deposition.

When the screen is fabricated from intrinsically catalytic material it is necessary that the material also be electroconductive. However, when the basic material forming the screen is non-conductive as well as non-catalytic and the catalytic material is subsequently applied thereto, it is necessary that the applied catalytic coating be electroconductive. Such catalytic coating may be applied to the screen material either before or after it is formed into the desired porous body, although for most purposes it is likely to be more advantageous to coat the screen after it is formed.

While the electrode of the invention is applicable to various types of fuel cells, experimental investigation has demonstrated its advantageous application to acidic fuel cell systems wherein the oxygen electrode is contacted with acid electrolyte containing thallic ions, such as the system disclosed in copending application Serial No. 151,267 of James E. McEvoy, entitled Oxygen Electrode for Fuel Cells, filed November 9, 1961. The present application and application Serial No. 151,267 have a common assignee. In the system of the reference, both the fuel and oxygen electrodes are contacted by acidic electrolyte, such as aqueous sulfuric acid of 10 to 40% concentration, but the electrodes are segregated by a selectively permeable membrane, and the portion of acid electrolyte contacting the oxygen electrode contains dissolved thallic ions in a concentration of anywhere from 0.001 molar to maximum solubility of the thallic ion in the particular acid electrolyte solution.

Half-cell experiments with oxygen electrode of the foregoing thallic ion-acid system had produced such favorable polarization curves that a series of half-cell experiments employing the electrodes of the present invention were likewise tested in such system.

For comparison purposes, one experimental run was made with a platinum on porous baked carbon electrode and four experimental runs were made on screen-type electrodes prepared in accordance with the invention, the conditions and results of which are summarized as follows:

Experiment I

A porous carbon electrode was prepared from commercial baked carbon having an average pore diameter of about 33 microns. The electrode was heat treated in nitrogen for six hours at 900° C., then cooled in flowing nitrogen. 100 mg. of platinum, as platinum black, were then rubbed into the surface of the electrode and the latter was coated with a polymethylmethacrylate solution to assist the retention of the platinum black in the surface pores.

Figure 7:
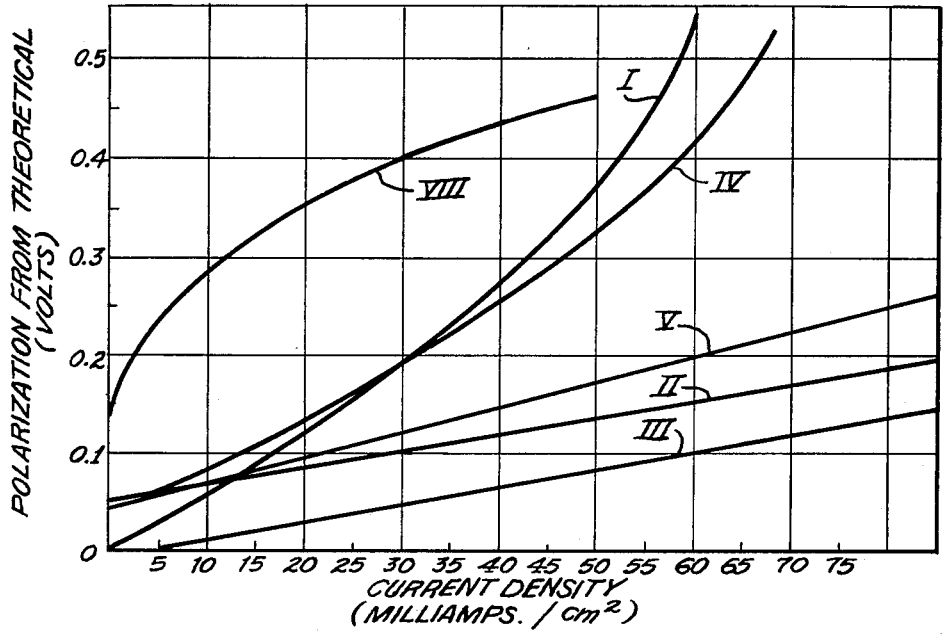
FIG. 7 is a graph showing a comparison of several mesh-type screen electrodes, in which the polarization from the theoretical oxygen potential is plotted against the measured current density.

The electrode was then tested as an oxygen electrode in a conventional half-cell test unit. Using 0.3 molar thallic sulphate in 30 wt. percent sulfuric acid, oxygen was bubbled in at a rate of 1500 cc./hr. under temperature conditions of 28° C. The data for this run are shown by curve I of FIG. 7.

Experiment II

A screen dipping solution was prepared by combining 10 cc. of chloroplatinic acid solution containing 10 mg. of platinum, 30 cc. of water, and 5 cc. of formic acid.

Three 100-mesh, stainless steel screens, of a size to replace in the half-cell test unit the porous carbon electrode used in Experiment I, were cleaned by washing, successively, in water, acetone, benzene, acetone and water, and shaken dry. The screens were then separately suspended in the above solution for about 16 hrs. at room temperature. Upon removal from the dipping solution the screens were washed with water and used directly in the test unit. Since the dipping solution contained only 10 mg. of platinum, the total deposit of platinum on the three screens could not exceed this amount. However, a considerable portion of platinum was found on the bottom of the solution container and subsequent investigation revealed that the deposit on the screens was probably less than 1 mg. of platinum per screen.

The three screens were then superimposed with no spacers to form a three layer electrode which was tested in the half-cell unit. The electrolyte and the oxygen flow rate were the same as in Experiment I, and the run was made at 30° C. The data for this run are shown by curve II in FIG. 7.

Experiment III

A screen dipping solution was prepared by combining 50 cc. of chloroplatinic acid solution containing 50 mg. of platinum and 10 cc. of formic acid.

Six 50-mesh stainless steel screens were cleaned, dipped and washed. Three screens were assembled alternately with two carbon ring spacers to form a three-layer electrode, and the remaining three screens were set aside for reserve. The total platinum deposit on the three-screen electrode was somewhat less than 25 mg. The run was carried out at 28° C., using an electrolyte and an oxygen rate as in Experiment II, the data for which are shown by curve III of FIG. 7.

Experiment IV

Three 100-mesh, stainless steel screens were prepared by the identical technique employed in Experiment II, but only one screen was tested in the half-cell unit. The test was run at 25° C., using an electrolyte and an oxygen rate as in Experiment II. The data for this run are shown by curve IV of FIG. 7. After the test run, the screen was analyzed for platinum content and was found to contain 0.16 mg. of platinum.

Experiment V

A dipping solution similar to that of Experiment III was prepared. Six 60-mesh, stainless steel screens were dipped in this solution and the solution was heated to boiling. The screens were then removed and water washed. Three screens were then assembled with carbon spacers as in Experiment III and the remaining screens set aside. The three-screen electrode was tested in the half-cell unit at 29° C., and after the run the screens were analyzed for platinum content. The analysis showed 0.73 mg. of platinum on one screen, 0.12 mg. on another, and 0.30 mg. on the third, for a total deposit of 1.15 mg. of platinum. The data for this run are shown by curve V of FIG. 7.

In order to determine the active life span of the electrods of the invention, several experimental life test runs were made on screen electrodes prepared for this purpose, reported as follows:

Experiment VI

Figure 8:
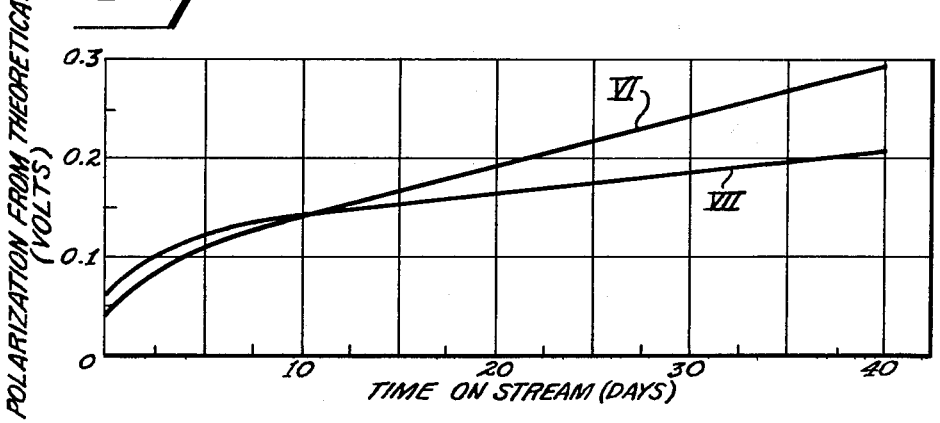
FIG. 8 is a graph showing life test data for several experimental runs, in which the polarization from the theoretical oxygen potential is plotted against the time on stream.

A dipping solution as for Experiment III, but containing 140 mg. of platinum was prepared. Twelve 100-mesh stainless steel screens were immersed at room temperature for about 16 hrs. When removed, it was found that about 40.7 mg. of platinum remained in the solution, indicating about 100 mg. of platinum retained by the twelve screens, or about 8 mg. of platinum per screen. The screens were water washed and then heat treated in a furnace to 300° C. The screens were removed immediately and three of the screens were formed into a single electrode, using stainless steel spacer rings which had also been dipped. The electrode was then tested in a half-cell unit, operated at a constant temperature of 43° C. and under constant load of 25.8 ma./cm.² for well over a month. The polarization voltage from theoretical potential was plotted against the days' time on stream, the results of which are shown by curve VI of FIG. 8.

Experiment VII

Again, a dipping solution similar to that of Experiment III was prepared, and three 100-mesh, stainless steel screens were suspended in the solution for one minute each, after the solution was heated to boiling. The screens were then heat treated in a furnace up to a temperature of 200° C. and removed immediately. The three screens were assembled as a composite electrode, without spacers and the same life test was given to this electrode, the results of which are shown by curve VII of FIG. 8.

The data of Experiments I to V, illustrated graphically by the correspondingly numbered curves of FIG. 1, were then compared with data previously obtained by an experimental run in the half-cell testing unit at 29° C., using a commercial porous silver electrode in 34% aqueous KOH electrolyte. The comparative data for this latter run are shown by the curve VIII of FIG. 7.

From the foregoing experiments, which provide a comparison between the several individual screen electrodes formed in accordance with the invention, as well as a comparison between the group of tested screen electrodes and a good commercial grade of porous silver electrode, it is evident that the screen electrodes have appreciably improved polarization characteristics and excellent useful life expectancy.

Electrodes prepared in accordance with the invention have several distinct major advantages over the usual type of carbon, graphite and metallic electrodes heretofore employed.

For one thing, the electrode of the invention eliminates dead-end pores since all of the so-called pores provided by the mesh construction or by the perforation of sheet material extend through the individual screens and, when the screens are superimposed to form a layered electrode, communicate freely, although not necessarily in exact straight-line relationship, with pores of adjacent screens to provide uninterrupted pores or passageways through the composite electrode.

In fabricating the composite screen electrodes, specific pore diameters and pore lengths may be selected to fit the system used, so that the pores will not be too small or too large. Since it is possible to carefully control or predetermine the pore size and pore length for the individual screens, the electrode may be made of screens having different pore diameters. Thus, the pores at one side of the electrode may be sized differently from those at the other side, or the pores throughout the central region of the laminate electrode may be of a size different from those adjacent the faces.

Since there are no blocked or dead-end pores, there is no entrapment of gaseous material. This is especially important when air is used as the oxidant, since there can be no pocketing of the unused nitrogen to lower the efficiency of the cell. This eliminates any need for periodic purges or pressure releases.

The agitation of the liquid film around the mesh openings or sheet perforations, usually inherent in the operation of such electrodes, will keep the stationary liquid layer at nominal thickness, thereby minimizing the length of the diffusion path of both reactants into and products away from the electrode. Furthermore, the diffusion problems created by long and/or dead-end pores are substantially overcome.

The very nature of the materials employed in the screen, and the manner of construction, precludes any need for coating the electrode surface with a semi-sealant, such as polymethylmethacrylate.

The above-mentioned advantages apply as well to systems utilizing dissolved fuel, such as methanol in either basic or acidic electrolyte, as systems employing gas diffusion.

Although the electrodes of the invention have been described herein specifically in connection with experimental investigation of the usefulness as oxygen electrodes in a fuel cell, it is to be understood that they are equally adaptable for use as fuel electrodes. Furthermore, they may be employed in either basic or acidic systems.

With respect to the materials of construction, it is to be understood that the invention is not limited to the use of any particular material. While commercial type stainless steel mesh screens were employed as supports in the foregoing experimental investigations, and platinum was applied to the stainless steel as a catalytic material, such use was primarily for the purpose of demonstrating the utility of the invention. Important considerations in selecting the electrode material or materials are non-corrosiveness in the acidic or basic electrolyte, catalytic activitiy and electro-conductivity, as well as the physical characteristics which provide strength and durbaility to make practicable the fabrication, assembly, and ultimate use of the electrode. Among the materials considered to be applicable are other non-corrosive metals or alloys, or glass or graphite cloth. Graphite cloth and a method for producing the same is disclosed in an article entitled "Fiber Stretches Graphite Use," appearing at page 70 of the May 4, 1959 issue of "Chemical Engineering."

*Experiment VIII*

A screen dipping solution was prepared by combining 65 cc. of chloroplatinic acid solution containing 133 mg. of platinum and 20 cc. of formic acid.

Graphite cloth, of approximately 30-mesh was cut to form six screens of a size to replace in the half-cell test unit the stainless steel screen supported electrode of Experiment III. The six cloths were washed with acetone and then with water. Excess wash water was removed by shaking. The screens were separately suspended in the above dipping solution for 16 hours at room temperature. After removal from the dipping solution the screens were washed, assembled as a six-layer superimposed electrode with no spacers and used directly in the test unit. Analysis of the remaining dipping solution indicated, by difference, that the six screens contained a total of about 110 mg. of platinum.

The electrode was tested with the electrolyte and the oxygen flow rate similar to that in Experiment I and at temperatures as indicated in Table I below.

TABLE 1

| Temperature | Current Density, (Milliamps/cm.$^2$) | Polarization From Theoretical (Volts) |
|---|---|---|
| 17° C. | Open circuit | 0.00 |
| | 25.8 | 0.04 |
| | 57.6 | 0.06 |
| | 77.5 | 0.06 |
| 43° C. | Open circuit | [1]—0.01 |
| | 57.6 | [1]—0.01 |
| | 77.5 | [1]—0.01 |
| 65° C. | Open circuit | [1]—0.05 |
| | 57.6 | [1]—0.03 |
| | 77.5 | [1]—0.03 |
| 82° C. | Open circuit | [1]—0.05 |
| | 77.5 | [1]—0.05 |
| | 129.0 | [1]—0.03 |

[1] Better than theoretical oxygen potential.

The stability of the electrode was demonstrated in striking manner in further testing in which it was subjected successively to current densities of 25.8 ma./cm.$^2$ for 72 hours, 57.6 ma./cm.$^2$ for 24 hours, 77.5 ma./cm.$^2$ for 24 hours and 103 ma./cm.$^2$ for 24 hours, all at approximately 43° C., without showing any deviation from a substantially zero polarization (volts) from the theoretical oxygen potential.

*Experiment IX*

Another set of six, sized and washed screens was placed for 72 hours in a chloroplatinic acid solution containing 10 mg. of platinum and 10 cc. of formic acid and kept at room temperature. The screens were removed, washed and assembled without spacing agents in the test cell for testing with electrolyte and oxygen flow rates as in Experiment VIII. Analysis of the remaining dipping solution indicated, by difference, that the six screens contained a total of somewhat more than 1 mg. of platinum. The test results are shown in Table 2.

TABLE 2

| Temperature | Current Density (Milliamps/cm.$^2$) | Polarization From Theoretical (Volts) |
|---|---|---|
| 28° C. | Open circuit | [1]—0.01 |
| | 25.8 | 0.05 |
| | 57.6 | 0.08 |
| | 77.5 | 0.10 |
| 65° C. | Open circuit | [1]—0.05 |
| | 25.8 | [1]—0.03 |
| | 57.6 | [1]—0.01 |
| | 77.5 | 0.00 |

[1] Better than theoretical oxygen potential.

The results of Experiments VIII and IX demonstrate the excellence of screen electrodes prepared in accordance with the invention and further demonstrate the utility thereof.

With respect to so-called pore size, which would be determined by the dimensions and cross-sectional configuration of the openings provided in the mesh screen or in the perforate sheet screen, it is contemplated that the individual pore area for most practical purposes should be equivalent to that provided by mesh screens in the size range of about 5–400 mesh, U.S. Standard.

When the electrode is employed as the oxygen electrode of a fuel cell, either oxygen or an oxygen-containing gas, such as air, may be used as the oxidant. If air is used, any unused nitrogen may serve to carry off water, if any, formed in the reaction. If air is employed in a quantity sufficient only to provide the needed oxygen for the reaction, the unused nitrogen may be conveyed to the fuel side of the cell and used to aspirate the fuel feed.

Obviously, many modifications and variations of the invention as hereinbefore set forth may be made without departing from the spirit and scope thereof and therefore only such limitations should be imposed as are indicated in the appended claims.

What is claimed is:

1. A fuel cell comprising: a chamber adapted to contain a confined body of aqueous liquid electrolyte having known surface tension characteristics; inlet means for introducing reactant materials into said chamber; outlet means at the top of said chamber, and separated from said inlet means by said body of electrolyte, for venting from said chamber gaseous reaction products rising from said body of electrolyte; and spaced electrodes within said chamber in continuous contact with said electrolyte and being arranged to contact also the reactant materials flowing into said chamber; said electrodes comprising a plurality of electro-conductive screens fixedly positioned and electro-conductively connected in close juxtaposition as a composite layered electrode body arranged to provide a multiplicity of uninterrupted transverse paths through aligned openings in the successive screen layers, each of said screens being provided with uniformly distributed openings extending therethrough and the openings of each screen being of predetermined, substantially uniform size and length, the plurality of aligned openings which define each of said transverse paths through the layered body having the cumulative effect of through-pores coextensive with said paths, the size and length of which through-pores are determined, respectively, by the size of the screen openings and the number of screen layers employed, said size and number being selected in accordance with the penetration characteristics of the reactants and the liquid electrolyte, as determined by said surface tension characteristics, so as to maintain a stationary liquid layer of nominal thickness over the active surface areas of the electrode, thereby minimizing the length of the diffusion path for reactants flowing into and products flowing out of the electrode.

2. A fuel cell as in claim 1 including a deposit of catalytically active material on the surface areas of the electrode.

3. A fuel cell as in claim 2 in which said catalytically active material comprises platinum.

4. A fuel cell as in claim 2 in which said screens are formed of a corrosion resistant material.

5. A fuel cell as in claim 4 in which said corrosion resistant material is a metal alloy.

6. A fuel cell as in claim 4 in which said metal alloy is stainless steel.

7. A fuel cell as in claim 4 in which said corrosion resistant material is a non-metallic cloth.

8. A fuel cell as in claim 7 in which said non-metallic cloth is graphite cloth.

9. A fuel cell as in claim 7 in which said non-metallic cloth is composed of glass.

10. A fuel cell as in claim 1 in which said screen openings are of a size equivalent to the openings in mesh within the size range of about 5–400 mesh, U.S. Standard.

11. A fuel cell as in claim 10 in which there is a variance in the size of the openings in adjacent screen layers.

12. A fuel cell as in claim 11 in which the size of the openings in successive screen layers increases from one side of the electrode to the other.

13. A fuel cell as in claim 1 in which said plurality of screens are in contiguous relationship throughout substantially their entire broad geometrical area.

14. A fuel cell as in claim 1 including thin electro-conductive spacers between narrow peripheral areas adjacent screen layers.

15. A fuel cell as in claim 10 in which said screens are mesh.

16. A fuel cell as in claim 10 in which said screens are perforated thin sheet material.

References Cited by the Examiner

UNITED STATES PATENTS

| | | | |
|---|---|---|---|
| 966,578 | 8/10 | Murphy et al. | 209—401 X |
| 2,082,513 | 6/37 | Roberts | 209—401 X |
| 2,384,463 | 9/45 | Gunn et al. | 136—86.1 |
| 2,615,839 | 10/52 | Willier | 204—109 |
| 2,860,175 | 11/58 | Justi | 136—86 |
| 2,913,380 | 11/59 | Gullett | 204—284 |
| 2,969,315 | 1/61 | Bacon | 136—86 |
| 3,072,558 | 1/63 | Myers et al. | 204—290 |

FOREIGN PATENTS 303,027  10/29  Great Britain.

OTHER REFERENCES

Chemical Engineering publication, issued May 4, 1959 (page 70).

ALLEN B. CURTIS, *Primary Examiner.*

JOHN H. MACK, WINSTON A. DOUGLAS, *Examiners.*